United States Patent [19]

Burgess

[11] Patent Number: 5,190,645
[45] Date of Patent: Mar. 2, 1993

[54] AUTOMATICALLY ADJUSTING SHALE SHAKER OR THE LIKE

[76] Inventor: Harry L. Burgess, 5400 Memorial #511, Houston, Tex. 77007

[21] Appl. No.: 695,540

[22] Filed: May 3, 1991

[51] Int. Cl.$^5$ ............................................. B01D 33/00
[52] U.S. Cl. ................................... 210/144; 210/188;
  210/389; 209/246; 209/364; 209/416;
  324/207.24
[58] Field of Search ............... 210/144, 113, 188, 384,
  210/388, 389; 209/246, 364, 416; 324/207.13,
  207.22, 207.24; 175/206; 166/267

[56] References Cited

U.S. PATENT DOCUMENTS

| | | |
|---|---|---|
| 2,701,061 | 2/1955 | Kluge . |
| 3,202,282 | 8/1965 | Ruzicka . |
| 3,317,041 | 5/1967 | Century . |
| 3,347,373 | 10/1967 | Dahlberg . |
| 3,447,671 | 6/1969 | Schweinfurth . |
| 3,668,939 | 6/1972 | Schrader . |
| 3,770,097 | 11/1973 | Musschoot . |
| 4,152,255 | 5/1979 | Musschoot ........................ 209/364 |
| 4,272,366 | 6/1981 | Dean et al. . |
| 4,279,091 | 7/1981 | Edwards . |
| 4,299,692 | 11/1981 | Musschoot ........................ 209/364 |
| 4,340,469 | 7/1982 | Archer ............................. 209/367 |
| 4,350,591 | 9/1982 | Lee ................................. 210/384 |
| 4,457,839 | 7/1984 | Bailey ............................. 210/388 |
| 4,887,464 | 12/1989 | Tannenbaum et al. ............ 175/206 |
| 4,911,834 | 3/1990 | Murphy .......................... 210/384 |

FOREIGN PATENT DOCUMENTS 877790 9/1961 United Kingdom .
1296201 11/1972 United Kingdom .

OTHER PUBLICATIONS

"Fluid Power's Smart Cylinders," *Design News*, Feb. 25, 1991.

Primary Examiner—Peter Hruskoci
Assistant Examiner—Robert James Popovics
Attorney, Agent, or Firm—Browning, Bushman Anderson & Brookhart

[57] ABSTRACT

A shale shaker or the like comprises a hollow body having an inlet and an outlet. A screen is mounted generally horizontally in the hollow body between the inlet and the outlet. A motive assembly is operatively connected to the screen for repetitively moving the screen. At least one generally horizontal tube is connected to the screen for movement therewith. A solid weight freely movable longitudinally in the tube automatically adjusts the center of gravity of the attached screen.

24 Claims, 3 Drawing Sheets

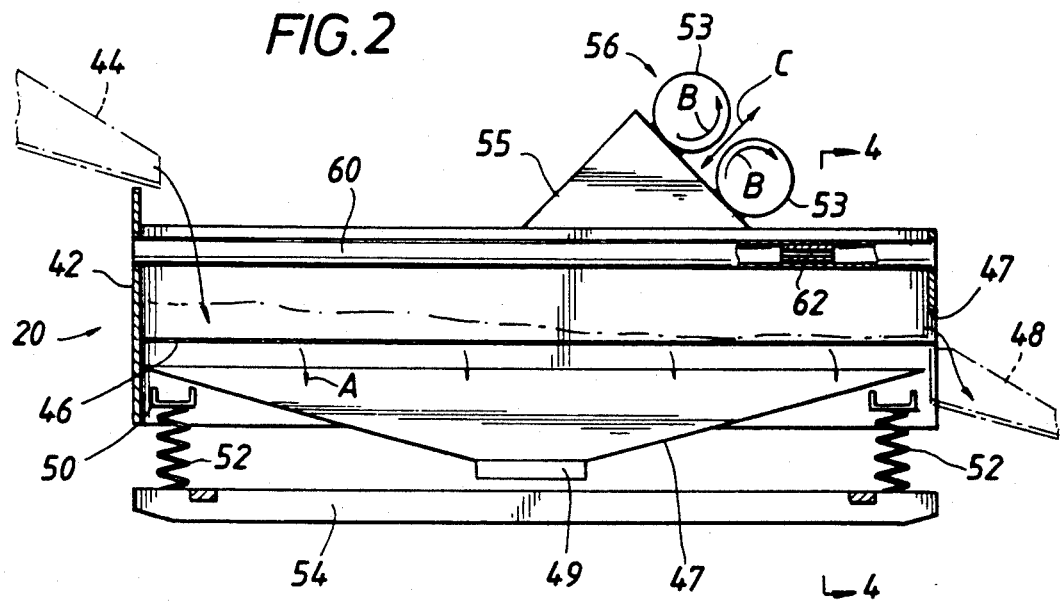
FIG. 2
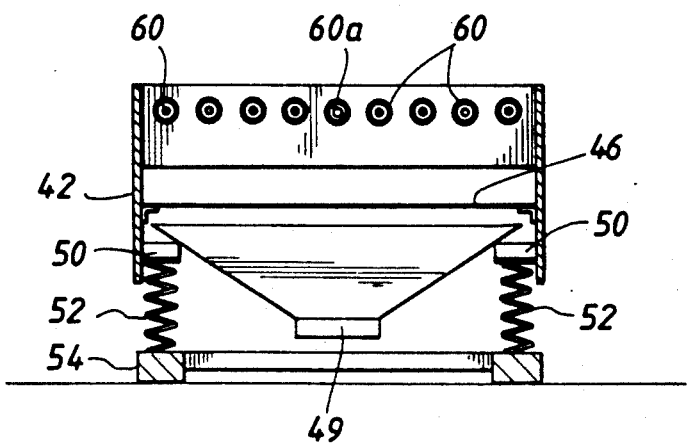
FIG. 3
FIG. 4

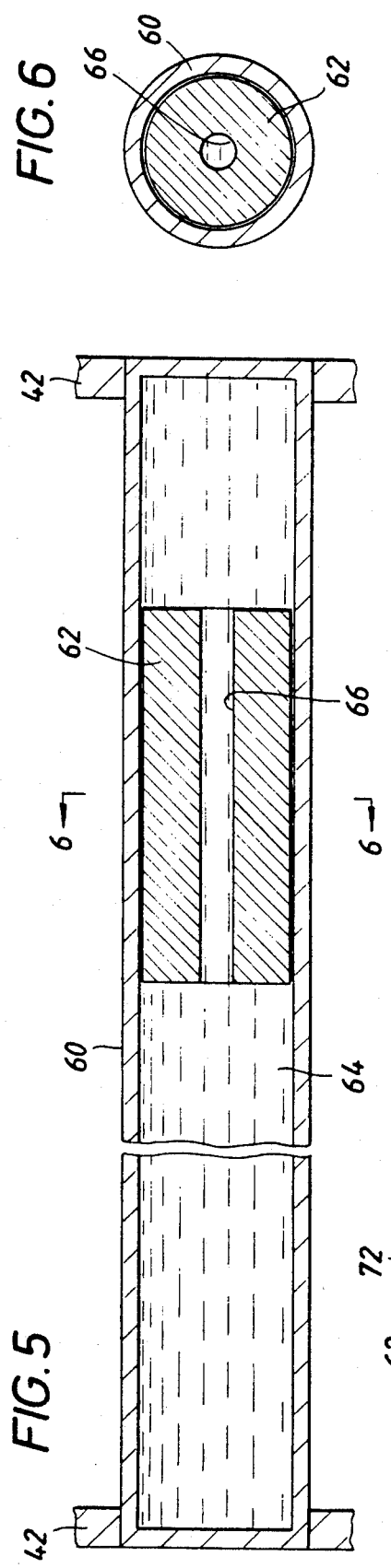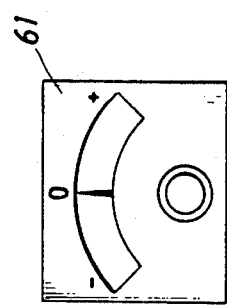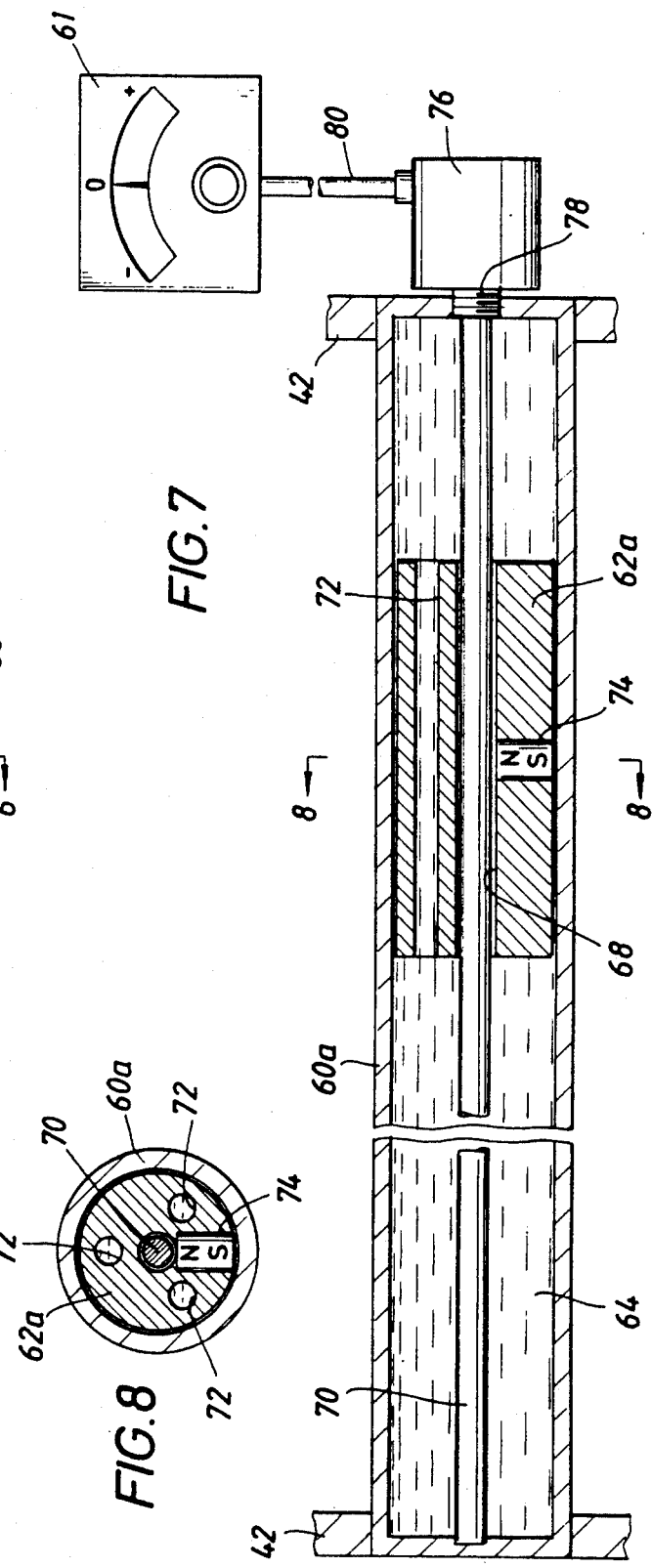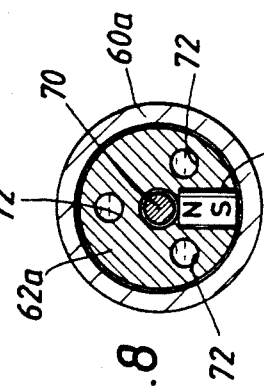

AUTOMATICALLY ADJUSTING SHALE SHAKER OR THE LIKE

BACKGROUND OF THE INVENTION

The present invention pertains to devices such as shale shakers wherein a screen which lies generally horizontally is moved in a repetitive manner, i.e. vibrated or oscillated, such movement typically involving at least some motion transverse to the long dimensions of the screen, i.e. generally vertically. Relatively large solids, such as cuttings from a well, are supported on the screen and, by virtue of its repetitive movements and/or angle, moved therealong from an inlet end to an outlet end, while a carrier liquid and more finely divided solids, e.g. drilling mud, are separated from these cuttings, falling downward through the interstices of the screen, to be separately collected, further treated, and recycled.

A major problem with such devices is that the very material being handled may tend to dampen or otherwise interfere with proper movement of the screen so that the material is not properly distributed or moved by the screen. Typically, this dampening tends to occur at the inlet end of the screen, which is usually the very place where proper movement and distribution is most needed.

The typical approach to this problem has been to mount the screen at an angle so that, while it still lies generally horizontal, i.e. with a major component of direction in the horizontal sense, it is inclined so as to adjust its center of gravity to compensate for the dampening of the screen movement at the inlet end. However, in the past, this has been largely a matter of guesswork; it is imprecise, requires stopping and restarting of operation of the device, and is a general nuisance. Furthermore, if the density of the material changes, the screen may then have to be readjusted, multiplying the above problems.

Other problems generally encountered in well drilling operations, while seemingly unrelated to the aforementioned problems with shale shakers, can, surprisingly, also be addressed by preferred embodiments of the present invention, which solves the basic shale shaker problem. This involves early detection and remedying of such conditions as: gas cutting of the drilling mud; lost circulation; changes in volumetric flow rate of mud; changes in drilling rate; and changes in the proportions of cuttings to mud. It will be appreciated that some of these, such as lost circulation, are always problems in and of themselves. Others may or may not be problems in themselves, but in any event, may be symptomatic of those which are definite problems. For example, a change in the volumetric flow rate of mud could be symptomatic of partial circulation loss.

SUMMARY OF THE INVENTION

In its most basic form, the present invention provides a means for automatically adjusting the center of gravity of the repetitively moving portion, including at least the screen, of a shale shaker or like device. At least one elongate member is connected to the screen for movement therewith. Typically, both the screen and the elongate member are mounted horizontally, but spaced apart, in the hollow body of the shale shaker, and the repetitive movements are applied to this entire body. A solid weight is laterally constrained by but freely longitudinally movable along the elongate member. It has been found that such a weight will automatically adjust its position along the length of the member so as to compensate for any dampening caused by the material being handled, thereby automatically adjusting the center of gravity of the screen on an ongoing basis. Thus, if the density or distribution of the mud and cuttings changes, the weight will move and automatically adjust the center of gravity of the screen as needed. Preferably, the elongate member is a tube with the weight therein.

Also preferably, there are a plurality of such tubes arranged parallel, but spaced apart, so that the mud or cuttings can flow between them. The weights in the different tubes can adjust to slightly different positions to compensate for lateral irregularities in the distribution of the material being handled. Thus, since the travel of each weight is along the length of the screen, and the multiple tubes are arrayed across the width, there is adjustment along both dimensions of a plane parallel to the screen. The use of multiple tubes and weights also reduces the necessary size and weight of each individual weight and its tube.

Each weight is preferably a piston-like member with a fairly close fit in its respective tube, and a longitudinal liquid-displacement bore therethrough. The bore allows the piston to move freely even though the tube is filled with a de-gassed oil, which inhibits rattling of the weight in use and serves as a liquid bearing for the weight.

In preferred embodiments, the device further comprises a sensor assembly associated with at least one of the tubes and its respective weight and operative to detect the position of the weight and produce a functionally related output signal. It will be appreciated that the sorts of factors which cause a change in the position of the weight, i.e. changes in the volume, weight and/or density of the material being handled, can also be symptomatic of the various ancillary drilling problems referred to above. Thus, while the weights automatically adjust the center of gravity, the movement of a representative one of them can also be monitored so that, if there is too great a change, the cause can be quickly investigated and remedied. It is significant that the shale shaker is typically the first station the mud reaches after it leaves the well bore, and therefore detection of such factors at this point provides an early warning system, and depending upon the nature of the problem, may allow for the mud to be treated downstream of the shaker, before it is put back into the hole, so as to remedy the problem. Indeed, such treatment can be triggered by a control system automatically operated by the signal from the sensor assembly.

It is also significant that the sensor assembly can be easily provided by a fairly simple modification to an available device for monitoring the position of a piston within its cylinder.

Various objects, features, and advantages of the invention will be made apparent by the following detailed description, the drawings, and the claims.

BRIEF DESCRIPTION OF THE DRAWINGS

FIG. 2 is a longitudinal cross-sectional view through the shale shaker taken on the line 2—2 of FIG. 3.

FIG. 3 is a top plan view of the shale shaker.

FIG. 4 is a transverse cross-sectional view taken on the line 4—4 of FIG. 1.

FIG. 5 is an enlarged longitudinal cross-sectional view through one of the non-sensor tubes.

FIG. 6 is a transverse cross-sectional view taken on the line 6—6 of FIG. 5.

FIG. 7 is a view of the sensor assembly also including a longitudinal cross-section of the tube associated therewith.

FIG. 8 is a transverse cross-sectional view taken on the line 8—8 of FIG. 7.

DETAILED DESCRIPTION

Figure 1:
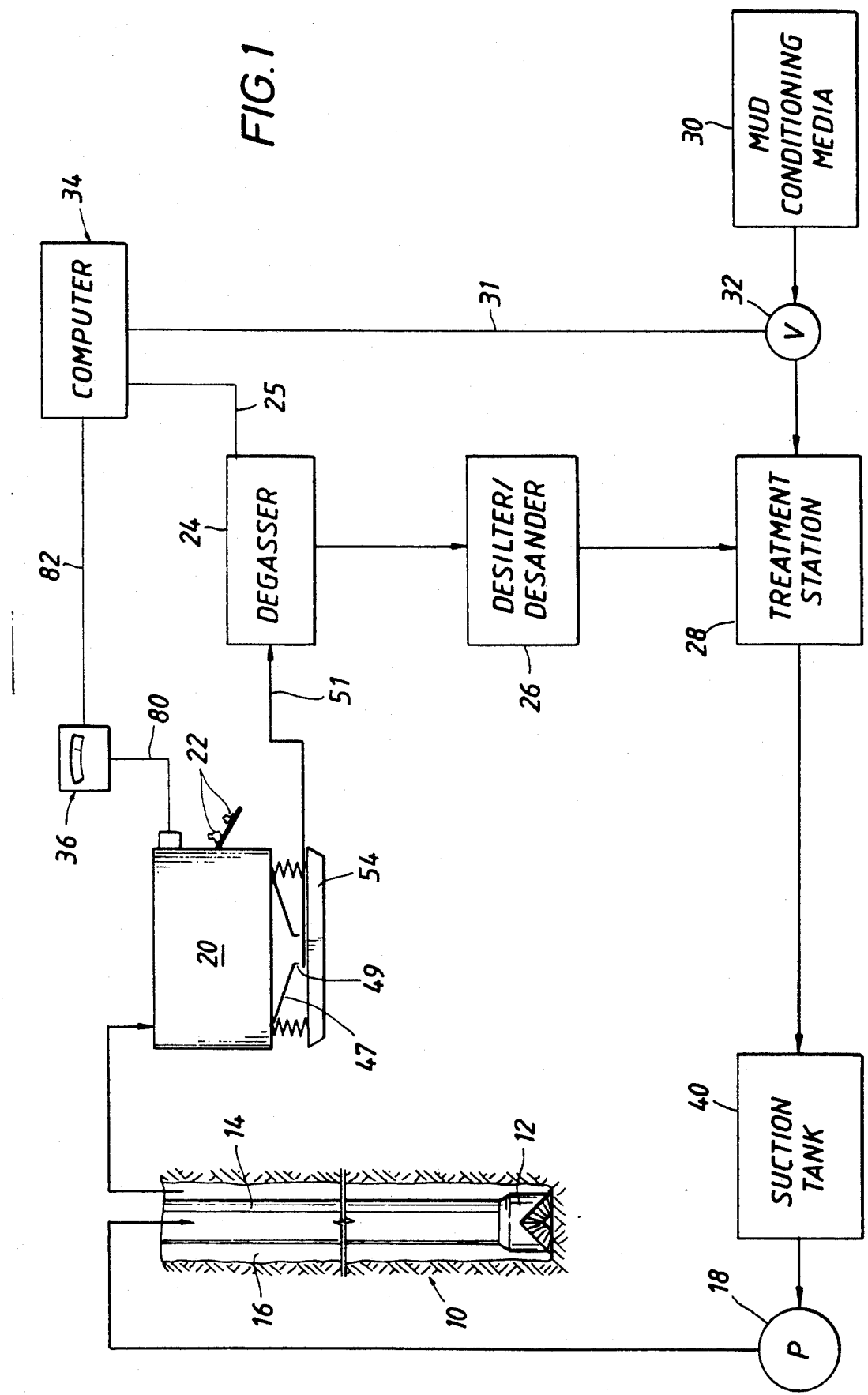
FIG. 1 is a diagrammatic representation of a drilling mud circuit in which a shale shaker according to the present invention can be incorporated.

Referring to FIG. 1, there is shown a well 10 being drilled by a bit 12 carried on a string of drill pipe 14. Drilling mud is pumped by a pump 18 into the drill pipe 14 and out through nozzles in the bit 12. The mud cools and cleans the cutters of the bit 12 and then passes up through the well annulus 16 flushing cuttings out with it.

After the mud is removed from the well annulus 16, it is treated before being pumped back into the pipe 14. First, the mud enters the shale shaker 20 where the relatively large cuttings 22 are removed. The mud then enters a degasser 24 where gas can be removed if necessary. Degasser 24 may be automatically turned on and off, as needed, in response to an electric or other suitable signal produced by a computer 34 and communicated to degasser 24 as indicated by line 25. The computer 34 produces the signal as a function of data from a sensor assembly 36 associated with shale shaker 20 and described more fully below. The data from sensor assembly 36 is communicated to computer 34 by line 82. The mud then passes to a desander and (or a desilter,) jointly represented by station 26, for removal of smaller solids picked up in the well.

The mud next passes to a treating station 28 where, if necessary, conditioning media, such as barite, may be added from source 30. As shown, suitable flow control means, indicated in a simplified form by valve 32, controls flow of media from source 30 to station 28. Valve 32, in turn, may be automatically operated by an electric or other suitable signal produced by computer 34 as a function of the data from sensor assembly 36, such signal being communicated to valve 32 as indicated by line 31.

From the station 28, the mud is directed to tank 40, from which pump 18 takes suction, to be re-cycled through the well. The system shown is exemplary, and it will be understood that additional components of the same types (e.g. additional treatment stations) or other types (e.g. centrifuges) could be included.

Referring now to FIGS. 2-4, shale shaker 20 comprises a box-like hollow body 42. Body 42 may be of virtually any conventional type, and is therefore merely shown and described in a relatively simple representative form. As shown, box 42 has a open top or upper end through which the untreated mud enters, at the left-hand end, from a suitable conveying means diagrammatically shown at 44. Mounted on the side walls of body 42, and extending transversely in a generally horizontal orientation, is a screen 46. The mesh of the screen is sized so that cuttings of a predetermined size, typically larger than grains of sand or silt, will remain on top of screen 46, while the remainder of the mud can pass through, as indicated by the arrows A. The cuttings pass out through an opening 47 in the right-hand end wall adjacent screen 46 onto means 48 for conveying them away to an appropriate site or into a container.

The mud which passes through the screen 46 falls through the open bottom of box-like body 42 where it is collected by a pan diagrammatically shown at 47. Pan 47 is mounted in any suitable manner so that it is stationary in use. For example, it may be mounted on skid assembly 54 (described below) or may rest on the underlying platform or other work surface. The bottom of pan 47 slopes downwardly to an outlet 49 communicated with degasser 24 by a suitable conduit 51.

The body 42 includes horizontal members 50 disposed below screen 46 and to which are attached strong helical compression springs 52. Springs 52 in turn mount body 42 to a stationary skid-type base 54. It can be seen that this spring mounting will allow movement of body 42 with respect to base 54, the potential motion being universal in nature, but limited in extent. Springs 52 could be replaced by other means, such as elastomeric mountings.

Body 42 is in fact moved in a repetitive pattern by motive assembly 56, as well known in the art. Assembly 56 may be of any well-known type, and is therefore only diagrammatically illustrated. As shown, it includes two rotors 53 driven in opposite directions, as indicated by arrows B, by self-contained motors (not shown). The rotors 53 are mounted angularly and off-center on supports 55 fixed on body 42, and are also eccentrically weighted. The effect of this is an angular shaking action, indicated by arrow C, which facilitates separation of the mud from the cuttings, and also helps to advance the cuttings from the left-hand or inlet end of screen 46 to the right-hand or outlet end thereof.

A number of tubes 60 are mounted in body 42, on the opposed end walls thereof, so that they extend generally horizontally and lengthwise of body 42 above screen 46. These tubes 60 lie parallel to one another, but laterally spaced apart by a distance great enough to readily permit flow of both mud and cuttings therebetween from the open top of the body 42 onto the screen 46. These tubes may, for example, be welded into holes or recesses in the end walls of body 42. The central tube 60a is associated with a sensor assembly to be described more fully below. All the other tubes 60 and their contents are similar to one another and are shown in greater detail in FIGS. 5 and 6.

Specifically, within each tube 60 there is a piston-like weight 62 which is laterally constrained, by virtue of being contained within tube 60, but freely movable lengthwise along the tube. Preferably, the weight has a cylindrical outer surface which fairly closely mates with the inner surface of tube 60 so that the weight is kept from excessive rattling and/or changes in orientation in use. To further protect against excessive rattling, lubricate the weight 62, and in effect form a liquid bearing therefor, a buffer liquid such as a suitable oil 64 fills the tube 60. It is preferable that this liquid be degassed before the tube 60 is filled and closed. Changes in orientation are also resisted by virtue of the fact the weight 62 has a substantial length, albeit much shorter than that of the tube 60.

Weight 62 has a central longitudinal liquid displacement bore 66 therethrough. This allows for easy relative longitudinal displacement of the oil 64, so that lengthwise movements of weight 62 are not unduly impeded.

When the shale shaker is in use, to the extent that mud entering the device may tend to dampen the repetitive movements of the left-hand or inlet end of the screen, weights 62 will, as the repetitive movements continue, move to the right to adjust the center of gravity of the entire body 42 and attached parts, including screen 46, so that all parts of the screen are moving to the same extent. If conditions change, for example if there is a change in the volumetric flow rate of mud or the density of the mud, the weights will move either to the right or left, as needed, to continually adjust the center of gravity.

The use of an array of tubes 60 and weights 62 allows for each individual weight to be relatively small, while still adequately balancing the center of gravity of the entire body 42. Also, the lateral array of tubes 60 allows for different weights 62 to seek different longitudinal positions, so as to balance for lateral irregularities in the distribution of the material being handled on the screen 46.

The center tube 60a is shown in greater detail in FIGS. 7 and 8. This tube likewise contains a liquid 64 and a weight 62a, which behaves like the other weights 62 in balancing the center of gravity. However, the central bore 68 of weight 62a is not a liquid displacement bore, but rather serves as a guide hole for an elongate probe 70 which forms part of the sensor assembly 36. Probe 70 is mounted on the ends of tube 60a and extends lengthwise through the center of tube 60a and also through hole 68 in weight 62a. Weight 62a has three symmetrically disposed liquid displacement bores 72, disposed radially outwardly of hole 68. Weight 62a also has a magnet 74 mounted therein. Alternatively, the entire weight 62a can be magnetized.

Probe 70 is connected to a sensor device 76 by a fitting 78 which extends through one of the end walls of tube 60a. Sensor 76 and the associated probe 70 are of a commercially available type, such as the type sold under the trademark Temposonics II, made by MTS Sensors Division, Research Triangle Park, N.C. The sensor and probe can detect the position of the magnetized weight 62a and produce a signal which is a function of that position. The signal is conveyed by line 80 to readout device 61, where it is translated into a visible signal in the form of the position of an indicator needle on a scale. Members 70, 78, 76, 80 and 61 jointly make up the sensor assembly 36. Upon start up, the needle position is adjusted to the center or zero point, whereafter any positive reading will be indicative of a movement of the weight 62a, which in turn must be indicative in some change in a factor such as mud density, proportion of cuttings to mud, or volumetric flow rate of mud.

The signal produced by the device 61 is also conveyed by line 82 (FIG. 1) to the computer 34 which operates degasser 24 and valve 32. In other words, the computer is programmed so that, if it receives a signal of a direction and magnitude indicating the need for treatment of the mud, the valve 32 will be operated to admit a mud conditioning medium, or adjust the rate of flow of such medium, into station 28. If the magnitude and direction of the signal indicates that the mud is gas cut, the degasser 24 will be automatically turned on. Alternatively, the operator can operate valve 32 and degasser 24 manually based on the reading of device 61.

By the same token, if the reading on device 36 indicates to the operator that there is some other potentially problematic condition which may require attention other than mud treatment or degassing, e.g. lost circulation which may indicate an impending blowout, the operator can take corrective measures at the earliest possible moment, since the condition is detected at the first station the mud enters after being removed from the well.

Various modifications of the exemplary embodiment described above will be apparent to those of skill in the art. By way of example only, while the weights are enclosed within tubes in the illustrated embodiment, it might be possible to provide weights in the form of rings which ride along the outside of elongate rods. However, the use of tubes with internal weights is generally preferred so that the relatively moving surfaces can be isolated from the mud being treated as well as from other contaminants. Similarly, the sensor assembly illustrated operates on electromagnetic principles, but other types of position sensors could be used. Other modifications might involve differences in the placement of the tubes 60, e.g. below, rather than above, screen 46, or even on the outside of the body 42. While it is preferable that the sensor tube 60a be centrally located, so as to be best indicative of the center of gravity of the entire movable assembly, another of the tubes could be so used.

The exemplary embodiment has been described in connection with a well-drilling operation wherein the cuttings are rock fragments which the shaker separates from drilling mud. The invention is also applicable to other systems, e.g. mining operations wherein the shaker separates coal fragments from a different kind of carrier liquid, such as water. Certain aspects of the invention are applicable to still other types of material handling devices.

Numerous other variations will suggest themselves to those of skill in the art. Accordingly, it is intended that the scope of the invention be limited only by the claims which follow.

What is claimed is:

1. A shaker for separating cuttings from a drilling or mining operation from a carrier liquid, said shaker comprising:
    a hollow body having a mud inlet and a mud outlet;
    a screen mounted generally horizontally in said hollow body between said mud inlet and said mud outlet;
    a motive assembly operatively connected to said screen for repetitively moving said screen;
    a plurality of generally horizontal, generally parallel elongate members connected to said screen for movement therewith; and
    a respective solid weight laterally constrained by each of said elongate members, but freely longitudinally movable therealong.

2. The apparatus of claim 1 wherein said elongate members are tubes and said weights are disposed therein.

3. The apparatus of claim 2 further comprising a stationary base; said hollow body being connected to said base for limited relatively movement;
    said tubes being mounted on said hollow body and thereby connected to said screen; and
    said motive assembly being connected to said hollow body for repetitively moving said hollow body, and thereby said screen and said tube, with respect to said base.

4. The apparatus of claim 2 wherein each of said tubes contains a buffer liquid, said weight being a piston-like member with a fairly close fit in said tube and having a longitudinal liquid displacement bore therein.

5. The apparatus of claim 4 wherein said buffer liquid is a de-gassed oil substantially filling the volume of said tube not otherwise occupied.

6. The apparatus of claim 4 wherein said tubes are generally parallel and laterally spaced apart.

7. The apparatus of claim 6 further comprising a sensor assembly for detecting the position of one of said weights in its respective tube and producing a functionally related output signal.

8. The apparatus of claim 7 wherein said one weight comprises a magnet and has a longitudinal guide hole therethrough; and
    said sensor assembly comprises a probe slidably received in the guide hole of said one weight and extending lengthwise through the respective tube for sensing the position of said magnet.

9. The apparatus of claim 8 wherein said guide hole is in the center of said one weight;
    said one weight having a plurality of such liquid displacement bores symmetrically disposed radially outwardly of said guide hole.

10. The apparatus of claim 9 wherein the liquid displacement bores of the others of said weights are in their centers.

11. The apparatus of claim 7 wherein said one tube is generally centrally located among said tubes.

12. The apparatus of claim 7 wherein said carrier liquid is drilling mud, and wherein said sensor assembly is operatively connected to a control system for treating the mud downstream of said shale shaker in response to said signal.

13. The apparatus of claim 12 wherein said control system includes means for dispensing a mud conditioning medium.

14. The apparatus of claim 13 wherein said control system includes a degasser.

15. The apparatus of claim 12 wherein said control system includes a degasser.

16. A material handling device comprising:
    a generally horizontal screen;
    a motive assembly operatively connected to said screen for repetitively moving said screen to cause solids to move therealong;
    a plurality of generally horizontal, generally parallel tubes connected to said screen for movement therewith;
    a respective piston-like weight in each of said tubes, freely slidable lengthwise of the tube, with a fairly close fit in the tube, and having a longitudinal liquid displacement bore therethrough; and
    a liquid substantially filing the volume of each tube not otherwise occupied.

17. The apparatus of claim 16 wherein said liquid is a de-gassed oil.

18. A shaker for separating cuttings from drilling mud comprising:
    a hollow body having a mud inlet and a mud outlet;
    a screen mounted generally horizontally in said hollow body between said mud inlet and said mud outlet;
    a motive assembly operatively connected to said screen for repetitively moving said screen;
    weights mounted for limited horizontal movement with respect to the screen for automatically adjusting the center of gravity of said screen; and
    a sensor assembly for detecting the position of one of said weights and producing a functionally related output signal.

19. The apparatus of claim 18 wherein said sensor assembly is operatively connected to a control system for treating the mud downstream of said shale shaker in response to said output signal.

20. The apparatus of claim 19 wherein said control system includes means for dispensing a mud conditioning medium.

21. The apparatus of claim 20 wherein said control system includes a degasser.

22. The apparatus of claim 19 wherein said control system includes a degasser.

23. A shaker for separating cuttings from a drilling or mining operation from a carrier liquid, said shaker comprising:
    a hollow body having a mud inlet and a mud outlet;
    a screen mounted generally horizontally in said hollow body between said mud inlet and said mud outlet;
    a motive assembly operatively connected to said screen for repetitively moving said screen;
    at least one generally horizontal elongate member connected to said screen for movement therewith;
    a solid weight laterally constrained by said elongate member, but freely longitudinally movable therealong; and
    a sensor assembly for detecting the position of said weight and producing a functionally related output signal.

24. The apparatus of claim 23 comprising a plurality of such tubes, each with a respective such weight therein.

* * * * *

UNITED STATES PATENT AND TRADEMARK OFFICE
CERTIFICATE OF CORRECTION

PATENT NO. : 5,190,645
DATED : March 2, 1993
INVENTOR(S) : Harry L. Burgess It is certified that error appears in the above-identified patent and that said Letters Patent is hereby corrected as shown below:

In Column 8, Line 1, change "filing" to --filling--.

Signed and Sealed this

Fourteenth Day of December, 1993

*Attest:*

BRUCE LEHMAN

*Attesting Officer*   *Commissioner of Patents and Trademarks*